Aug. 14, 1962     J. E. JOHNSTON     3,049,232

METHOD AND APPARATUS FOR RECLAIMING PARTICLES FROM A MIXTURE

Filed April 19, 1960

INVENTOR
JAMES E. JOHNSTON
BY
*Louis L. Gagnon*
ATTORNEY

United States Patent Office 3,049,232
Patented Aug. 14, 1962

---

3,049,232
METHOD AND APPARATUS FOR RECLAIMING PARTICLES FROM A MIXTURE
James E. Johnston, Southbridge, Mass., assignor to American Optical Company, Southbridge, Mass., a voluntary association of Massachusetts
Filed Apr. 19, 1960, Ser. No. 23,229
3 Claims. (Cl. 209—111.5)

The field of this invention is that of extraction techniques, and the invention relates more particularly to a novel method and apparatus for reclaiming particles from mixture with other particles in accordance with differences in optical characteristics of the particles.

In the manufacture of various articles by grinding processes in which laps or grinding wheels embedded with abrasive diamond particles are utilized, and particularly in dressing such grinding tools preparatory to article manufacture, valuable diamond particles are worn or chipped from the tools and become commingled with particles of other materials forming the residue of the dressing or grinding processes. For example, in dressing diamond laps or generating wheels used in the manufacture of lens blanks and lenses, diamond particles worn or chipped from the laps or wheels are collected in a mixture with corundum or aluminum oxide particles, the abrasive used in wheel dressing, in a proportion of about one part in five thousand. Since the known processes of recovering diamond particles from such a mixture have not proven economically feasible when practiced by individual users of diamond grinding tools, and since the proportion of diamond particles present in such a mixture is so small that transportation of the entire mixture or residue for reclamation of the diamond particles by specialists in that process has not been warranted, such diamond-bearing mixture has generally been discarded as waste material until invention of the method and apparatus herein disclosed.

It is an object of this invention to provide a novel method and apparatus for reclaiming particles from mixture with particles of a different type in accordance with differences in the optical characteristics or properties of the particles; to provide such a method and apparatus which can be economically used even for recovering a relatively small quantity of particles from mixture with a large proportion of particles of a different type; and to provide such an apparatus which can be inexpensively manufactured.

It is a further object of this invention to provide a continuous process, and a simple and inexpensive apparatus for carrying out the process, to reclaim particles of a particular index of refraction from mixture with particles having a different index of refraction; to provide such a process and apparatus which can be economically used for recovering diamond particles from mixture with aluminum oxide particles; and to provide such a process and apparatus which can be utilized either for separating diamond particles from such a mixture or for enriching diamond content of such a mixture to an extent sufficient to warrant transportation thereof for subsequent separation of the diamond particles at another location.

Briefly described, the method provided by this invention comprises the steps of directing light upon successive groups of particles forming a particle mixture measuring selected light phenomena resultant therefrom, and segregating those groups of particles indicated by said measuring to cause light phenomena most nearly corresponding to those which would result from directing said light upon particles of the type to be reclaimed, thereby to form a smaller particle mixture having a higher proportion of particles of the type to be reclaimed. Preferably, the above-described process is repeated the desired number of times, each time performing the sequence of process steps upon a smaller particle mixture derived from the previous performance of the sequence, for forming an ultimate mixture having the desired proportion of particles of the type to be reclaimed.

In a practical application of this method invention wherein particles of a particular index of refraction are to be reclaimed from mixture with particles of a different index of refraction, for example in recovering diamond particles from mixture with aluminum oxide particles, the particles are combined with a liquid to form a slurry which is continuously pumped from a feeding zone through a sequence of extracting zones in each of which light is directed through portions of the slurry successively passing through the extracting zones. The light directed through successive slurry portions, which is variously refracted or diffused in accordance with the composition of respective slurry portions, preferably is converted into electrical energy and is then measured, those slurry portions indicated by the measuring to cause light diffusion most nearly corresponding to that which would result from directing said light upon a slurry containing only particles of the type to be reclaimed being segregated and pumped to the next extracting zone in sequence, the other slurry portions being returned to the feeding zone for reprocessing. In this process, the segregated slurry portions will have a higher proportion of particles of the desired type than those slurry portions returned for reprocessing, and, as will be readily understood, segregation of slurry in each extracting zone in the sequence can be regulated to segregate slurry portions having a progressively higher proportion of particles of the type to be reclaimed, whereby slurry segregated in the final extracting zone can have the desired proportion of particles of the type to be reclaimed. Preferably, the process is continuous so that, by the laws of mathematical probability, substantially all particles of the desired type will eventually be reclaimed from those slurry portions repeatedly returned through the feeding zone for reprocessing.

In a preferred embodiment, apparatus provided by this invention for carrying out the above-described process can include feeding means, such as a slurry hopper and means for pumping slurry from the hopper, as well as a plurality of gauging means disposed in sequence for successively receiving slurry pumped from the hopper. Each of the gauging means includes a light source adapted to direct light upon slurry portions passing through the gauging means, preferably optical means such as a microscope for viewing said slurry portions, and means, such as a photoelectric cell, disposed to measure selected light phenomena, such as light refraction or diffusion, resultant from directing light upon said slurry portions. The apparatus also includes segregating means responsive to said measuring, for example, electrically actuatable valve means located between each of the gauging means and responsive to respective photoelectric means, adapted to segregate those slurry portions which cause light phenomena most nearly corresponding to those which would result from directing said light upon particles of the type to be reclaimed. The valve means are adapted to pass said segregated slurry portions to the next gauging means in sequence and to return other slurry portions to the feeding means for reprocessing.

Other objects and advantages of the method and apparatus provided by this invention will appear in the following more detailed description of the invention, the description referring to the drawing in which.

Figure 1:
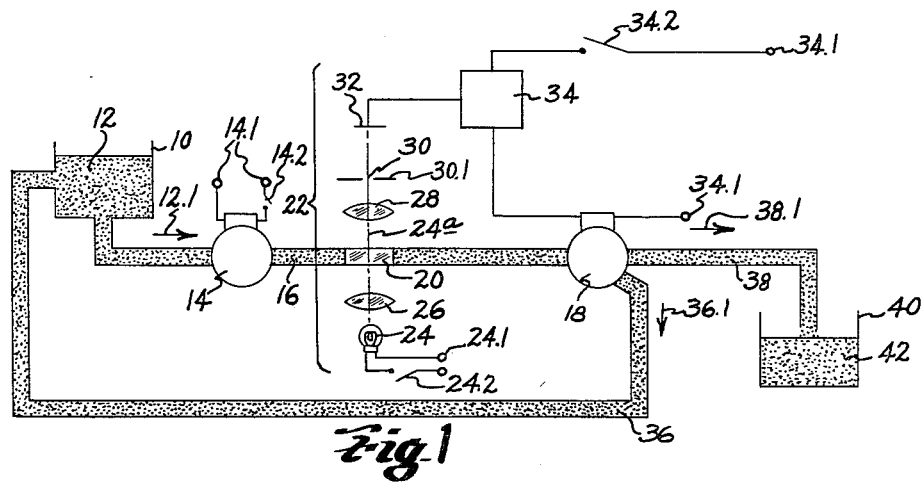
FIG. 1 is a diagrammatic view illustrating one embodiment of the apparatus provided for carrying out the process of this invention.
Figure 2:
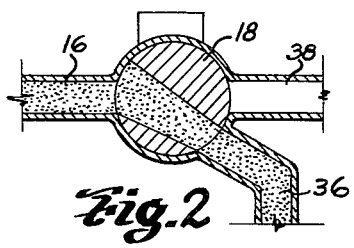
FIG. 2 is a partial diagrammatic view of the apparatus valve means.

Referring to the drawing, FIGS. 1 and 2 diagrammatically illustrate the method and apparatus of this invention in an application adapted to reclaim particles from mixture with particles of a different type in accordance with differences in the indices of refraction of the particles, a system well adapted for the recovery of diamond particles from mixture with aluminum oxide ($Al_2O_3$) particles. However, it should be understood that, within the scope of this invention, the method and apparatus could be adapted to reclaim particles from a mixture in accordance with other optical characteristics of the particles. For example, the method and apparatus could be adapted to reclaim particles from a mixture in accordance with particle color, configuration, or surface finish as measured by the light-reflective properties of the particles.

Referring to the system illustrated in FIG. 1, 10 indicates a hopper adapted to receive a slurry 12 which may comprise a mixture of diamond and aluminum oxide particles suspended in a liquid. Such a particle mixture might be obtained as the sludge or residue of a process of dressing diamond grinding tools as noted above. The liquid selected for forming the slurry preferably has an index of refraction corresponding generally to that of the aluminum oxide particles and preferably has a relatively high specific gravity such that particles of the described type can be adequately suspended therein. Since diamond particles have an index of refraction of 2.42 and a specific gravity of 3.51 whereas aluminum oxide particles have an index of refraction of 1.65 and a specific gravity of approximately 3.80, a suitable liquid for combination therewith to form the slurry 12 could be metholene iodide having an index of refraction of 1.74 corresponding generally to that of the aluminum oxide particles and having a specific gravity of 3.30 corresponding generally to both the diamond and aluminum oxide particles. In such a slurry, settling of the particles from suspension in the liquid would occur slowly, and, as will be described below, the refractive powers of the diamond particles would be in sharp contrast to those of the other two components of the slurry. It should be understood that it is not absolutely necessary to form a slurry within the scope of this invention and that, particularly where particles are to be reclaimed in accordance with light-reflecting characteristics of the particles, the particle mixture can be disposed in the hopper in dry form.

A pump means 14, preferably an electrically operable pump of conventional design, is associated with the hopper pump 10 and is adapted to feed a stream of the slurry 12 continuously through the piping 16 to an electrically-operable, two-way valve means 18 as indicated by the arrow 12.1 in FIG. 1, the piping having at least a short transparent section 20 interposed therein. The pump means is connected to a suitable power source, as indicated in conventional manner by the line terminals 14.1, and is actuatable by means of the switch 14.2. Of course, where, as noted above, particles are to be processed in dry form, other means suitable for continuously feeding groups of particles through a similar conduit system can be provided.

A gauging means 22 is associated with the transparent piping section 20 and preferably includes a light source such as the lamp 24 which is preferably provided with an optical system as is diagrammatically indicated by the lens 26 for directing a beam of light, as at 24a, through the transparent piping section and therefore through the slurry portions successively passed through the transparent piping section. The light source is connected to a suitable power source as indicated by the line terminals 24.1 and is actuatable by means of the switch 24.2.

The gauging means 22 also includes a microscope 28, or other optical system, which is mounted within the apparatus so that the transparent piping section lies within the focal plane of the microscope or optical system 28, the microscope being adapted for viewing slurry portions successively passing through the transparent piping section. Preferably, the microscope is adapted for viewing a slurry portion containing a substantial number of particles at one time. As will be readily understood, light directed through successive slurry portions will exhibit various light phenomena which will bear a definite relation to the composition of the slurry portions. For example, light directed through said slurry portions will be variously refracted by each of the slurry components in accordance with the indices of refractions of the slurry components so that a slurry portion having more or less than average of a particular component will, to a corresponding extent, cause more or less light diffusion or refraction. Accordingly, the microscope 28 is provided with light stop means 30 having an aperture 30.1 which is positioned relative to the microscope lens for permitting only that light which is refracted to a predetermined extent to pass through the aperture 30.1, whereby the amount of light passing through the aperture after being refracted by slurry portions successively passing through the beam of light 24a will have a definite relation to the composition of said slurry portions. Where the slurry comprises a mixture of diamond and aluminum oxide particles suspended in metholene iodide as above described, and where, as illustrated, the light stop 30 is disposed to permit passage therethrough of light which is refracted to a relatively slight degree, a slurry portion having a low diamond particle content will permit a substantial amount of light to pass through the aperture 30.1, whereas a slurry portion having a high diamond particle content will cause maximal light refraction and will permit only a small amount of light to pass through the aperture 30.1.

Conversely, of course, the light stop aperture 30.1 could be positioned out of alignment with the light source 24 and the transparent piping section 20 so that only light refracted to a substantial degree would pass through the aperture, whereby a strong signal induced by said light impinging upon the photo-responsive means indicating maximal light refraction would indicate a relatively high diamond content in the slurry portion being gauged.

The gauging means 22 also includes a photo-responsive means such as the photoelectric cell 32 which is disposed relative to the light stop 30 so that light passing through the aperture 30.1 impinges upon the photoelectric cell and induces an electric current or signal proportional to the amount of said light. Conventional amplifying means 34, connected to a power source as at 34.1 and actuatable by a switch 34.2, are associated with the photo-electric cell 32 for amplifying said signal to regulate the valve 18 interposed in series with the amplifying means.

The valve 18, as shown in FIG. 2, can be adapted to move from the position shown in FIG. 2, wherein slurry passing through the piping 16 is directed into the piping 36 for return to the hopper 10, as shown by the arrow 36.1, and a position wherein the slurry is directed through the piping 38 to the collecting tank 40 as shown by the arrow 38.1. The liquid embodied in the slurry directed into the tank 40 can be removed therefrom in any conventional manner. For example, the collector 40 can be formed of a fine wire mesh or other foraminous material for permitting said liquid to drain therefrom. As will be readily understood, the electrically operable valve can be adjusted to move between said positions in response to the strength of the signal received from the photo-responsive means 32 for segregating those slurry portions causing light phenomena most nearly corresponding to those which would result from directing said light upon slurry containing only particles of the type to be reclaimed. Thus, a strong signal induced by the light impinging upon the photoelectric cell would indicate a low diamond content in the slurry portion passing through the transparent piping section and would move the valve to the position shown in FIG. 2 for returning said slurry portion to the hopper 10, whereas a weak signal would indicate a high diamond content in said slurry portion and would move the valve for directing said slurry portion into the collecting tank 40. Slurry 42 segregated into the piping 38 and collected in the tank 40 forms a smaller particle mixture, after removal of the liquid from the segregated slurry, having a higher proportion of diamond particles than the mixture originally placed within the hopper 10. By continuous operation of the system, with repeated reprocessing of slurry portions returned through the valve 18 to the hopper 10, substantially all diamond particles in the original particle mixture would be segregated into the tank 40 in accordance with the laws of mathematical probability. Further, the valve means 18 can be adjusted to segregate only those slurry portions having the desired proportion of diamond particles therein, so that the particle mixture obtained from slurry collected in the tank 40 can be adapted to have any desired degree of diamond content.

Figure 3:
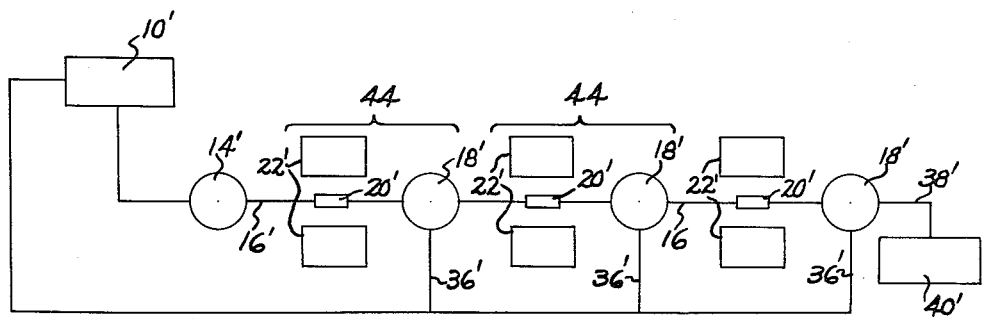
FIG. 3 is a diagrammatic view of an alternative embodiment of the apparatus provided by this invention.

In an alternative embodiment of this invention as illustrated in FIG. 3, a plurality of gauging means 22' and valves 18' can be connected in alternate sequence for segregating slurry portions having progressively higher diamond particle content as described below. In this embodiment, slurry disposed in the hopper 10' is continuously fed by the pump 14' through a sequence of piping sections 16' each having a transparent piping section 20' interposed therein. Each transparent piping section has a gauging means 22' associated therewith in the manner described above with reference to FIG. 1 and each gauging means is adapted to regulate a valve means 18' interposed in the system after the respective gauging means. Preferably, respective valves 18' are adjusted so that each valve in sequence is adapted to segregate slurry portions having a higher proportion of diamond particles than was segregated by the valve means prior in sequence and to direct said segregated portions to the next gauging means in sequence, returning other slurry portions through piping 36' to the hopper 10' for reprocessing. Each gauging means 22' in conjunction with a transparent piping section 20' forms a light measuring station which together with the segregating station represented by a valve 18' forms a particle extracting zone 44. Although the system illustrated in FIG. 3 incorporates three extracting zones 44, it will be understood that any desired number of extracting zones can be connected in sequence within the scope of this invention so that slurry segregated in the final extracting zone and directed through the piping 38' to be collected in the tank 40' can have any desired proportion of diamond particles therein.

Figure 4:
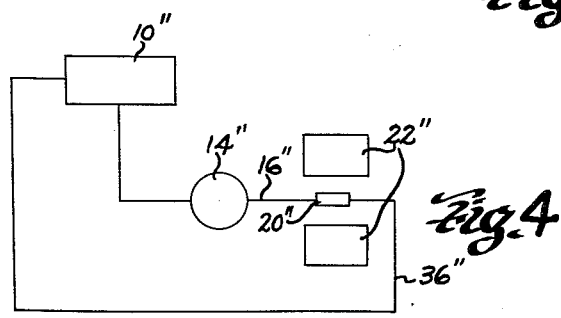
FIG. 4 is a diagrammatic view of another embodiment of said apparatus.

Of course, adjustment of the valves 18' for segregation of those slurry portions effecting light refraction or diffusion to the extent most nearly corresponding to that which would result from directing light through slurry containing only particles of the type to be reclaimed presupposes knowledge of the extent to which such purified slurry would create light diffusion or refraction. According to this invention, slurry composed of diamond and aluminum oxide particles in suspension, or a similar slurry containing particles having differing optical properties, can be preliminarily fed from a hopper 10" through a transparent piping section 20" as shown in FIG. 4. A gauging means 22" can be associated with the transparent piping section for determining average values for the electrical signal induced within the gauging means in the manner described with reference to FIG. 1. Thereafter, the slurry can be processed in a system such as that illustrated in FIG. 3 wherein the first extracting zone in the sequence provided by that system is adjusted to effect segregation of slurry portions indicated by the gauging means in said extracting zone to cause light diffusion or refraction to an extent corresponding more nearly than average to that which could be expected from directing light upon slurry containing only particles of the type to be reclaimed.

Although particular embodiments of the method and apparatus provided by this invention have been described for the purpose of illustration, it should be understood that this invention includes all modifications and equivalents thereof which fall within the scope of the appended claims.

Having described my invention, I claim:

1. For reclaiming particles having a particular index of refraction from mixture with particles having a different index of refraction, that method which comprises as steps: providing a liquid of selected index of refraction; combining the liquid and particle mixture for forming a slurry; providing a light source; passing successive portions of the slurry through the path of a light beam emitted from said source so that the beam is transmitted through said slurry; measuring the extent of light diffusion resulting from passage of the beam through said slurry portions; segregating those portions of the slurry indicated by said measuring to cause light diffusion most nearly corresponding to that which would result from directing said light through slurry containing only particles of the type to be reclaimed; and thereafter removing the liquid from said segregated portions of the slurry for forming a smaller particle mixture having a higher proportion of particles of the type to be reclaimed.

2. For reclaiming particles having a particular index of refraction from mixture with particles having a different index of refraction, that method which comprises as steps: providing a liquid having an index of refraction substantially corresponding to that of the particles other than those to be reclaimed; combining the liquid and particle mixture for forming a slurry; providing a light source; passing successive portions of the slurry through the path of a light beam emitted from said source so that the beam is transmitted through said slurry; measuring the extent of light diffusion resulting from passage of the beam through said slurry portions; segregating those portions of the slurry indicated by said measuring to cause light diffusion most nearly corresponding to that which would result from directing said light through slurry containing only particles of the type to be reclaimed; and thereafter removing the liquid from said segregated portions of the slurry for forming a smaller particle mixture having a higher proportion of particles of the type to be reclaimed.

3. The continuous process of reclaiming particles of a particular index of refraction from mixture with particles having a different index of refraction, said process comprising as steps: providing a liquid having an index of refraction substantially corresponding to that of the particles other than those to be reclaimed; combining the liquid and particle mixture for forming a quantity of a slurry; establishing a feeding zone, a pumping zone and a series of extracting zones in sequence, each extracting zone having a light measuring station and a segregating station; continuously feeding the slurry from the feeding zone through the pumping zone and the series of extracting zones; directing light through successive portions of the slurry passing the light measuring station in each extracting zone and measuring the extent of light diffusion resultant therefrom; at each segregating station, segregating those portions of the slurry indicated by the measuring previous thereto to cause light diffusion to the extent most nearly corresponding to that which would result from directing said light through particles of the type to be reclaimed; permitting said segregated portions of the slurry to pass to the next extracting zone in sequence and returning other portions of the slurry to the feeding zone for reprocessing; and removing the liquid from the quantity of slurry segregated in the final extracting zone.

References Cited in the file of this patent
UNITED STATES PATENTS

| 1,678,884 | Sweet | July 31, 1928 |
| 2,428,228 | Keck | Sept. 30, 1947 |

FOREIGN PATENTS

| 953,331 | Germany | Nov. 29, 1956 |